US012806931B2

(12) United States Patent
Daike

(10) Patent No.: US 12,806,931 B2
(45) Date of Patent: Nov. 24, 2026

(54) COMBINATION OF THERMAL TRANSFER SHEET AND INTERMEDIATE TRANSFER MEDIUM, METHOD FOR MANUFACTURING PRINTED MATERIAL, AND PRINTED MATERIAL

(71) Applicant: Dai Nippon Printing Co., Ltd., Tokyo (JP)

(72) Inventor: Akito Daike, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 609 days.

(21) Appl. No.: 17/753,827

(22) PCT Filed: Sep. 30, 2020

(86) PCT No.: PCT/JP2020/037158
§ 371 (c)(1),
(2) Date: Mar. 16, 2022

(87) PCT Pub. No.: WO2021/066016
PCT Pub. Date: Apr. 8, 2021

(65) Prior Publication Data

US 2022/0332136 A1 Oct. 20, 2022

(30) Foreign Application Priority Data

Sep. 30, 2019 (JP) ................................. 2019-179331

(51) Int. Cl.
*B41M 5/382* (2006.01)
*B41M 5/42* (2006.01)

(52) U.S. Cl.
CPC .............. *B41M 5/382* (2013.01); *B41M 5/42* (2013.01)

(58) Field of Classification Search
CPC ................................ B41M 5/382; B41M 5/42
See application file for complete search history.

(56) References Cited

U.S. PATENT DOCUMENTS 6,803,936 B2 * 10/2004 Odaka ................ B41M 5/38257 347/213
2003/0174197 A1 9/2003 Odaka et al.
(Continued)

FOREIGN PATENT DOCUMENTS

JP 2003-326865 A 11/2003
JP 6098754 B1 3/2017
(Continued)

OTHER PUBLICATIONS

Extended European Search Report dated Feb. 27, 2024 (Application No. 20872494.8).

(Continued)

*Primary Examiner* — Sathavaram I Reddy
(74) *Attorney, Agent, or Firm* — Muncy, Geissler, Olds & Lowe, P.C.

(57) ABSTRACT

A combination of a thermal transfer sheet and an intermediate transfer medium of the present disclosure is characterized in that the thermal transfer sheet includes a first substrate and a coloring layer, a peel-off layer, and a heat seal layer disposed on the first substrate; the intermediate transfer medium includes a second substrate and a transfer layer; the peel-off layer is a layer for removing a portion of the transfer layer from the intermediate transfer medium; and an absolute value of a difference in 45-degree specular gloss between the heat seal layer and the transfer layer is 20% or more.

1 Claim, 3 Drawing Sheets

(a) (b)

(56) References Cited

U.S. PATENT DOCUMENTS

| | | | | |
|---|---|---|---|---|
| 2004/0209774 | A1 | 10/2004 | Odamura et al. | |
| 2005/0227024 | A1* | 10/2005 | Shimomura | G03F 3/108<br>428/32.79 |
| 2015/0239273 | A1 | 8/2015 | Sakamoto et al. | |
| 2018/0319191 | A1 | 11/2018 | Hayashi et al. | |
| 2019/0023048 | A1 | 1/2019 | Yoda et al. | |
| 2019/0061399 | A1 | 2/2019 | Iwasaki et al. | |

FOREIGN PATENT DOCUMENTS

| | | | | |
|---|---|---|---|---|
| JP | 2017-071217 | A | 4/2017 | |
| WO | 2008/050864 | A1 | 5/2008 | |
| WO | WO-2017154920 | A1 * | 9/2017 | B32B 27/00 |

OTHER PUBLICATIONS

English translation of the International Preliminary Report on Patentability (Chapter I) dated Apr. 14, 2022 (Application No. PCT/JP2020/037158).

Partial Supplemental European Search Report dated Nov. 6, 2023 (Application No. 20872494.8).

International Search Report and Written Opinion (Application No. PCT/JP2020/037158) dated Dec. 28, 2020 (with English translation).

Korean Office Action (with English translation) dated Apr. 29, 2024 (Application No. 10-2022-7013241).

* cited by examiner (a) (b)

COMBINATION OF THERMAL TRANSFER SHEET AND INTERMEDIATE TRANSFER MEDIUM, METHOD FOR MANUFACTURING PRINTED MATERIAL, AND PRINTED MATERIAL

TECHNICAL FIELD

The present disclosure relates to combinations of thermal transfer sheets and intermediate transfer media, methods for manufacturing printed materials, and printed materials.

BACKGROUND ART

Conventionally, various thermal transfer recording methods are known.

For example, a thermofusible transfer method is known in which a printed material is manufactured by stacking together a thermal transfer sheet including a thermofusible transfer coloring layer and a transfer-receiving article and then heating the thermal transfer sheet using a thermal head included in a thermal transfer printer to transfer the coloring layer to the transfer-receiving article and thereby form an image.

Also known is a sublimation thermal transfer method in which a printed material is manufactured by stacking together a thermal transfer sheet including a coloring layer containing a sublimation dye and a transfer-receiving article and then heating the thermal transfer sheet using a thermal head included in a thermal transfer printer to cause the sublimation dye to move from the coloring layer to the transfer-receiving article and thereby form an image.

It may be difficult to form an image using the sublimation thermal transfer method depending on factors such as the surface profile of the transfer-receiving article. In such cases, a printed material is manufactured using an intermediate transfer medium including a transfer layer. For example, a printed material is manufactured by heating the thermal transfer sheet to cause the sublimation dye to move from the coloring layer to a receiving layer constituting the transfer layer included in the intermediate transfer medium and thereby form an image and then heating the intermediate transfer medium to transfer the transfer layer to the transfer-receiving article.

It may be desirable to selectively transfer the transfer layer from the intermediate transfer medium depending on use. In PTL 1, a portion of a transfer layer is removed (peeled off) from an intermediate transfer medium so that the transfer layer can be selectively transferred to a transfer-receiving article.

CITATION LIST

Patent Literature

PTL 1: Japanese Unexamined Patent Application Publication No. 2003-326865

SUMMARY OF INVENTION

Technical Problem

Recently, there has been a need for printed materials with various designs depending on use. Examples of such printed materials include printed materials whose stereoscopic effect or texture differs partially, including printed materials having a raised portion partially formed thereon and printed materials partially having high glossiness.

One object to be achieved by the present disclosure is to provide a combination of a thermal transfer sheet and an intermediate transfer medium that can be used to manufacture a printed material whose stereoscopic effect or texture differs partially.

The disclosers have also found that, when a portion of a transfer layer is removed (peeled off) from an intermediate transfer medium, the transfer of the transfer layer to a transfer-receiving article may become unstable near the region where the transfer layer has been peeled off, and that a transfer defect may occur.

One object to be achieved by the present disclosure is to provide a method for manufacturing a printed material which includes a step of removing (peeling off) a portion of a transfer layer from an intermediate transfer medium using a combination of a thermal transfer sheet and the intermediate transfer medium and in which the above transfer defect can be inhibited.

One object to be achieved by the present disclosure is to provide a printed material manufactured using the above combination of the thermal transfer sheet and the intermediate transfer medium.

Solution to Problem

A combination of the present disclosure includes a thermal transfer sheet and an intermediate transfer medium. The thermal transfer sheet includes a first substrate and a coloring layer, a peel-off layer, and a heat seal layer disposed on the first substrate. The intermediate transfer medium includes a second substrate and a transfer layer. The peel-off layer is a layer for removing a portion of the transfer layer from the intermediate transfer medium.

In one embodiment, an absolute value of a difference in 45-degree specular gloss between the heat seal layer and the transfer layer is 20% or more.

In one embodiment, an absolute value of a difference between $\Delta L^*_{HS}$ and $\Delta L^*_T$ is 5 or more and 30 or less. $\Delta L^*_{HS}$ is an absolute value of a difference between L* values at angles of acceptance of 110 degrees and 15 degrees with respect to an angle of specular reflection for an angle of incidence of light when the light is incident on the heat seal layer at an angle of incidence of 45 degrees. $\Delta L^*_T$ is an absolute value of a difference between L* values at angles of acceptance of 110 degrees and 15 degrees with respect to an angle of specular reflection for an angle of incidence of light when the light is incident on the transfer layer at an angle of incidence of 45 degrees.

In one embodiment, an absolute value of a difference between $R_{HS}$ and $R_T$ is 20% or more and 50% or less. $R_{HS}$ is an average specular reflectance for light incident on the heat seal layer under conditions of an angle of incidence of 5 degrees and a measurement wavelength range of 400 nm or more and 700 nm or less. $R_T$ is an average specular reflectance for light incident on the transfer layer under the above conditions.

In one embodiment, an absolute value of a difference between a surface roughness ($Ra_{HS}$) of the heat seal layer and a surface roughness ($Ra_T$) of the transfer layer is 0.5 μm or more and 3.0 μm or less.

A method of the present disclosure for manufacturing a printed material includes the steps of:

providing a combination of a thermal transfer sheet and an intermediate transfer medium, the thermal transfer sheet including a first substrate and a coloring layer, a peel-off layer, and a heat seal layer disposed on the first substrate, the intermediate transfer medium including a second substrate and a transfer layer;

forming an image on the transfer layer included in the intermediate transfer medium;

heating and pressure-bonding together a portion of the transfer layer included in the intermediate transfer medium and at least a portion of the peel-off layer included in the thermal transfer sheet and then peeling off the heated and pressure-bonded portion of the transfer layer from the intermediate transfer medium;

transferring the heat seal layer from the thermal transfer sheet to a region of the intermediate transfer medium where the transfer layer has not been peeled off and a region of the intermediate transfer medium where the transfer layer has been peeled off; and transferring, to a transfer-receiving article, the transfer layer having the image formed on at least a portion thereof and the transferred heat seal layer in the region of the intermediate transfer medium where the transfer layer has not been peeled off, and the transferred heat seal layer in the region of the intermediate transfer medium where the transfer layer has been peeled off.

A printed material of the present disclosure is a printed material manufactured using a combination of a thermal transfer sheet and an intermediate transfer medium, the thermal transfer sheet including a first substrate and a coloring layer, a peel-off layer, and a heat seal layer disposed on the first substrate, the intermediate transfer medium including a second substrate and a transfer layer, the peel-off layer being a layer for removing a portion of the transfer layer from the intermediate transfer medium, the printed material including:

a transfer-receiving article;

the heat seal layer disposed on the transfer-receiving article; and the transfer layer disposed on a portion of the heat seal layer and having an image formed thereon.

Advantageous Effects of Invention

According to the present disclosure, it is possible to provide a combination of a thermal transfer sheet and an intermediate transfer medium that can be used to manufacture a printed material whose stereoscopic effect or texture differs partially.

According to the present disclosure, it is possible to provide a method for manufacturing a printed material which includes a step of removing (peeling off) a portion of a transfer layer from an intermediate transfer medium using a combination of a thermal transfer sheet and the intermediate transfer medium and in which the above transfer defect can be inhibited.

According to the present disclosure, it is possible to provide a printed material manufactured using the above combination of the thermal transfer sheet and the intermediate transfer medium.

DESCRIPTION OF EMBODIMENTS

[Combination of Thermal Transfer Sheet and Intermediate Transfer Medium]

A combination of the present disclosure includes a thermal transfer sheet 10 and an intermediate transfer medium 20.

Figure 1:
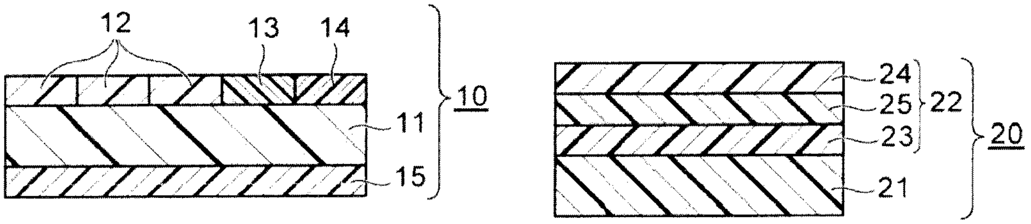
FIG. 1 shows schematic sectional views depicting one embodiment of a combination of a thermal transfer sheet and an intermediate transfer medium of the present disclosure.

In one embodiment, as shown in FIG. 1(*a*), the thermal transfer sheet 10 includes a first substrate 11 and coloring layers 12, a peel-off layer 13, and a heat seal layer 14 that are arranged sequentially in plane on the first substrate 11. As shown in FIG. 1(*b*), the intermediate transfer medium 20 includes a second substrate 21 and a transfer layer 22.

In the present disclosure, the peel-off layer is a layer for removing a portion of the transfer layer from the intermediate transfer medium.

The thermal transfer sheet is not limited to the form shown in FIG. 1(*a*), but may have the coloring layers 12, the peel-off layer 13, and the heat seal layer 14 disposed on different first substrates; that is, the thermal transfer sheet may include a plurality of thermal transfer sheets (not shown in the drawing).

In one embodiment, the thermal transfer sheet includes a plurality of sheets including a plurality of first substrates, a coloring layer, a peel-off layer, and a heat seal layer. In this case, at least two of the coloring layer, the peel-off layer, and the heat seal layer are disposed on different first substrates. For example, the coloring layer, the peel-off layer, and the heat seal layer are each disposed on a different first substrate.

In one embodiment, as shown in FIG. 1(*a*), the thermal transfer sheet 10 includes a back layer 15 on the opposite surface of the first substrate 11 from the surface on which the layers such as the coloring layers 12 are disposed.

In one embodiment, the thermal transfer sheet 10 includes a primer layer (not shown in the drawing) between the first substrate 11 and the coloring layers 12 and between the first substrate 11 and the peel-off layer 13.

In one embodiment, the thermal transfer sheet 10 includes a release layer (not shown in the drawing) between the first substrate 11 and the heat seal layer 14.

In one embodiment, as shown in FIG. 1(*b*), the transfer layer 22 included in the intermediate layer medium 20 includes a peeling layer 23 and a receiving layer 24.

In one embodiment, as shown in FIG. 1(*b*), the transfer layer 22 included in the intermediate transfer medium 20 includes a protective layer 25 between the peeling layer 23 and the receiving layer 24.

In one embodiment, the absolute value of the difference in 45-degree specular gloss between the heat seal layer included in the thermal transfer sheet (hereinafter simply referred to as "heat seal layer" in some cases) and the transfer layer included in the intermediate transfer medium (hereinafter simply referred to as "transfer layer" in some cases) is 20% or more. The above combination, thus configured, can be used to manufacture a printed material which partially has a raised portion and whose mattness or glossiness differs partially.

More preferably, the absolute value of the difference in 45-degree specular gloss between the heat seal layer and the transfer layer is 25% or more. The upper limit of the above absolute value of the difference in 45-degree specular gloss is, for example, 90%.

In one embodiment, the 45-degree specular gloss of the heat seal layer is 60% or more and 95% or less, preferably 70% or more and 90% or less. In one embodiment, the 45-degree specular gloss of the transfer layer is 5% or more and 75% or less, preferably 10% or more and 70% or less.

The 45-degree specular glosses of the heat seal layer and the transfer layer can be adjusted by adding the particles described later to the layer constituting the heat seal layer or the transfer layer.

In the present disclosure, the 45-degree specular glosses of the heat seal layer and the transfer layer are measured by transferring the heat seal layer of the thermal transfer sheet and the transfer layer of the intermediate transfer medium to the same transfer-receiving article in accordance with the method described in [Manufacture of Printed Material] of the Examples section and then making measurements using a gloss meter (VG 7000 manufactured by Nippon Denshoku Industries Co., Ltd.) in accordance with the method for measuring 45-degree specular gloss described in JIS Z 8741.

If the transfer layer includes a peeling layer, the peeling layer is to be located at the outermost surface of a printed material. The peeling layer preferably contains particles, which can impart good mattness to the raised portion on the printed material.

In one embodiment, the absolute value of the difference between $\Delta L^*_{HS}$ and $\Delta L^*_{T}$ of the above combination is 5 or more and 30 or less, preferably 8 or more and 25 or less, more preferably 10 or more and 20 or less. The above combination, thus configured, can be used to manufacture a printed material which partially has a raised portion and whose texture differs partially.

$\Delta L^*_{HS}$ is the absolute value of the difference between L* values at angles of acceptance of 110 degrees and 15 degrees with respect to the angle of specular reflection for the angle of incidence of light when the light is incident on the heat seal layer at an angle of incidence of 45 degrees. $\Delta L^*_{T}$ is the absolute value of the difference between L* values at angles of acceptance of 110 degrees and 15 degrees with respect to the angle of specular reflection for the angle of incidence of light when the light is incident on the transfer layer at an angle of incidence of 45 degrees.

Figure 4:
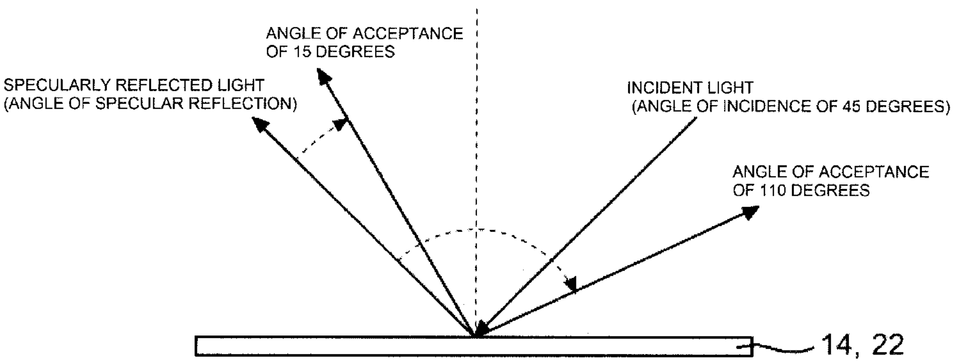
FIG. 4 is a schematic view showing the relationship between angle of incidence, angle of specular reflection, and angle of acceptance.

FIG. 4 is a schematic diagram showing the relationship between the angle of incidence, the angle of specular reflection, and the angle of acceptance. The angle of incidence is the angle with respect to the normal to the surface under measurement. Specular reflection refers to reflection in which the angle of incidence of light is equal to the angle of reflection. The L* value refers to the L* value in the L*a*b* color space defined by the International Commission on Illumination (CIE) and is a lightness index.

Preferably, $\Delta L^*_{T}$ is greater than $\Delta L^*_{HS}$.

In one embodiment, $\Delta L^*_{HS}$ is 10 or more and 60 or less, preferably 20 or more and 50 or less. In one embodiment, $\Delta L^*_{T}$ is 10 or more and 60 or less, preferably 20 or more and 50 or less. $\Delta L^*_{HS}$ and $\Delta L^*_{T}$ are set within these $\Delta L^*_{HS}$ and $\Delta L^*_{T}$ ranges so that the absolute value of the difference between $\Delta L^*_{HS}$ and $\Delta L^*_{T}$ falls within the above range.

In the present disclosure, the L* values of the heat seal layer and the transfer layer are measured by transferring the heat seal layer of the thermal transfer sheet and the transfer layer of the intermediate transfer medium to the same transfer-receiving article in accordance with the method described in [Manufacture of Printed Material] of the Examples section and then allowing light to be incident on the surface of the transferred heat seal layer and the surface of the transferred transfer layer at an angle of incidence of 45 degrees.

Each ΔL* can be adjusted, for example, by changing the content of the pearl pigment in the heat seal layer or the transfer layer. For example, at least one layer selected from the heat seal layer and the transfer layer preferably contains a pearl pigment.

In one embodiment, the absolute value of the difference between the content of the pearl pigment in the heat seal layer and the content of the pearl pigment in the transfer layer is 10% by mass or more. The upper limit of the absolute value of the difference is, for example, 50% by mass. The above combination, thus configured, can be used to manufacture a printed material which partially has a raised portion and whose pearliness differs partially.

If the transfer layer includes a peeling layer, the peeling layer is to be located at the outermost surface of a printed material. The peeling layer preferably contains a pearl pigment, which can impart good pearliness to the raised portion on the printed material.

If the heat seal layer has a multilayer structure and contains a pearl pigment, "the content of the pearl pigment in the heat seal layer" above refers to the content (% by mass) of the pearl pigment in a layer, included in the heat seal layer, that contains the pearl pigment.

If the transfer layer has a multilayer structure and contains a pearl pigment, "the content of the pearl pigment in the transfer layer" above refers to the content (% by mass) of the pearl pigment in a layer (e.g., a peeling layer), included in the transfer layer, that contains the pearl pigment.

If the heat seal layer and the transfer layer each contain a pearl pigment, the colors and particle sizes of the pearl pigments may be the same or different.

In one embodiment, the absolute value of the difference between $R_{HS}$ and $R_T$ in the above combination is 20% or more and 50% or less, preferably 25% or more and 45% or less, more preferably 25% or more and 40% or less. The above combination, thus configured, can be used to manufacture a printed material which partially has a raised portion and whose metallic luster differs partially.

$R_{HS}$ is the average specular reflectance for light incident on the heat seal layer under the conditions of an angle of incidence of 5 degrees and a measurement wavelength range of 400 nm or more and 700 nm or less. $R_T$ is the average specular reflectance for light incident on the transfer layer under the above conditions.

Specular reflectance is the ratio between the energy of incident light and the energy of reflected light when light coming from a light source is incident on and reflected by the surface under measurement and is received by a light-receiving probe at a position where the angle of reflection is equal to the angle of incidence (angle of specular reflection).

Preferably, $R_{HS}$ is greater than $R_T$.

In one embodiment, $R_{HS}$ is 5% or more and 80% or less, preferably 10% or more and 70% or less. In one embodiment, $R_T$ is 5% or more and 80% or less, preferably 10% or more and 70% or less. $R_{HS}$ and $R_T$ are set within these $R_{HS}$ and $R_T$ ranges so that the absolute value of the difference between $R_{HS}$ and $R_T$ falls within the above range.

In the present disclosure, the average specular reflectances of the heat seal layer and the transfer layer are measured by transferring the heat seal layer of the thermal transfer sheet and the transfer layer of the intermediate transfer medium to the same transfer-receiving article in accordance with the method described in [Manufacture of Printed Material] of the Examples section and then allowing light to be incident on the surface of the transferred heat seal layer and the surface of the transferred transfer layer at an angle of incidence of 5 degrees.

Each average specular reflectance can be adjusted, for example, by changing the content of the metallic pigment in the heat seal layer or the transfer layer. For example, at least one layer selected from the heat seal layer and the transfer layer preferably contains a metallic pigment.

In one embodiment, the absolute value of the difference between the content of the metallic pigment in the heat seal layer and the content of the metallic pigment in the transfer layer is 10% by mass or more. The upper limit of the absolute value of the difference is, for example, 60% by mass. The above combination, thus configured, can be used to manufacture a printed material which partially has a raised portion and whose metallic luster differs partially.

If the heat seal layer has a multilayer structure and contains a metallic pigment, "the content of the metallic pigment in the heat seal layer" above refers to the content (% by mass) of the metallic pigment in a layer, included in the heat seal layer, that contains the metallic pigment.

If the transfer layer has a multilayer structure and contains a metallic pigment, "the content of the metallic pigment in the transfer layer" above refers to the content (% by mass) of the metallic pigment in a layer, included in the transfer layer, that contains the metallic pigment.

If the heat seal layer and the transfer layer each contain a metallic pigment, the colors and particle sizes of the metallic pigments may be the same or different.

In one embodiment, the absolute value of the difference between the surface roughness ($Ra_{HS}$) of the heat seal layer and the surface roughness ($Ra_T$) of the transfer layer in the above combination is 0.5 μm or more and 3.0 μm or less, preferably 0.8 μm or more and 2.5 μm or less, more preferably 1.0 μm or more and 2.0 μm or less. The above combination, thus configured, can be used to manufacture a printed material which partially has a raised portion and whose texture differs partially.

The surface roughness Ra is the arithmetic average roughness measured in accordance with JIS B 0601.

Preferably, $Ra_T$ is greater than $Ra_{HS}$.

In one embodiment, $Ra_{HS}$ is 0.5 μm or more and 10 μm or less, preferably 1 μm or more and 5 μm or less. In one embodiment, $Ra_T$ is 0.5 μm or more and 10 μm or less, preferably 1 μm or more and 5 μm or less. $Ra_{HS}$ and $Ra_T$ are set within these $Ra_{HS}$ and $Ra_T$ ranges so that the absolute value of the difference between $Ra_{HS}$ and $Ra_T$ falls within the above range.

In the present disclosure, the surface roughnesses Ra of the heat seal layer and the transfer layer are measured by transferring the heat seal layer of the thermal transfer sheet and the transfer layer of the intermediate transfer medium to the same transfer-receiving article in accordance with the method described in [Manufacture of Printed Material] of the Examples section and then making measurements on the surface of the transferred heat seal layer and the surface of the transferred transfer layer.

Each surface roughness Ra can be adjusted, for example, by changing the content of foaming particles in the heat seal layer or the transfer layer. For example, at least one layer selected from the heat seal layer and the transfer layer preferably contains foaming particles.

In one embodiment, the absolute value of the difference between the content of the foaming particles in the heat seal layer and the content of the foaming particles in the transfer layer is 10% by mass or more. The upper limit of the absolute value of the difference is, for example, 50% by mass. The above combination, thus configured, can be used to manufacture a printed material which partially has a raised portion and whose texture differs partially.

If the transfer layer includes a peeling layer, the peeling layer is to be located at the outermost surface of a printed material. The peeling layer preferably contains foaming particles, which can impart good texture to the raised portion on the printed material.

If the heat seal layer has a multilayer structure and contains foaming particles, "the content of the foaming particles in the heat seal layer" above refers to the content (% by mass) of the foaming particles in a layer, included in the heat seal layer, that contains the foaming particles.

If the transfer layer has a multilayer structure and contains foaming particles, "the content of the foaming particles in the transfer layer" above refers to the content (% by mass) of the foaming particles in a layer (e.g., a peeling layer), included in the transfer layer, that contains the foaming particles.

If the heat seal layer and the transfer layer each contain foaming particles, the expansion ratios and particle sizes of the foaming particles may be the same or different.

In the present disclosure, the heat seal layer included in the thermal transfer sheet may contain a material selected from particles, pearl pigments, metallic pigments, and foaming particles, and at least one layer included in the transfer layer of the intermediate transfer medium may contain a material other than the selected material. For example, the heat seal layer may include a layer containing a pearl pigment, whereas the peeling layer constituting the transfer layer may contain a metallic pigment. A printed material manufactured using such a combination differs partially in stereoscopic effect and texture and has high design quality.

The individual layers included in the thermal transfer sheet and the intermediate transfer medium included in the combination of the thermal transfer sheet and the intermediate transfer medium will be described below.

(Thermal Transfer Sheet)

The thermal transfer sheet includes a first substrate and a coloring layer, a peel-off layer, and a heat seal layer disposed on the first substrate. In one embodiment, the thermal transfer sheet includes a back layer on the opposite surface of the first substrate from the surface on which the layers such as the coloring layer are disposed. In one embodiment, the thermal transfer sheet includes a primer layer between the first substrate and the coloring layer and between the first substrate and the peel-off layer. In one embodiment, the thermal transfer sheet includes a release layer between the first substrate and the heat seal layer.

(First Substrate)

Any substrate can be used as the first substrate without particular limitation as long as the substrate has sufficient heat resistance to withstand thermal energy applied during thermal transfer (e.g., heat from a thermal head) and also has sufficient mechanical strength to support the layers such as the coloring layer disposed on the first substrate and solvent resistance.

As the first substrate, for example, a film made of one or more resins or the like (hereinafter also simply referred to as "resin film") can be used. Examples of resins include polyesters such as polyethylene terephthalate (PET), polybutylene terephthalate (PBT), polyethylene naphthalate (PEN), 1,4-polycyclohexylenedimethylene terephthalate, and terephthalic acid-cyclohexanedimethanol-ethylene glycol copolymers; polyamides such as nylon 6 and nylon 6,6; polyolefins such as polyethylene (PE), polypropylene (PP), and polymethylpentene; vinyl resins such as polyvinyl chloride, polyvinyl alcohol (PVA), polyvinyl acetate, vinyl chloride-vinyl acetate copolymers, polyvinyl butyral, and polyvinylpyrrolidone (PVP); (meth)acrylic resins such as poly (meth)acrylates and polymethyl (meth)acrylate; imide resins such as polyimides and polyetherimides; cellulose resins such as cellophane, cellulose acetate, nitrocellulose, cellulose acetate propionate (CAP), and cellulose acetate butyrate (CAB); styrene resins such as polystyrene (PS); polycarbonates; and ionomer resins.

Among the above resins, from the viewpoint of heat resistance and mechanical strength, polyesters such as PET and PEN are preferred, and PET is particularly preferred.

In the present disclosure, "(meth)acrylic" is meant to include both "acrylic" and "methacrylic". "(Meth)acrylate" is meant to include both "acrylate" and "methacrylate".

Laminates of the above resin films can be used as the first substrate. Laminates of resin films can be fabricated by methods such as dry lamination, wet lamination, and extrusion.

If the first substrate is a resin film, the resin film may be either a stretched film or an unstretched film. From the viewpoint of strength, a uniaxially or biaxially stretched film is preferred.

The first substrate preferably has a thickness of 2 μm or more and 25 μm or less, more preferably 3 μm or more and 10 μm or less. This allows the first substrate to have good mechanical strength and to smoothly transmit thermal energy during thermal transfer.

(Coloring Layer)

The thermal transfer sheet includes a coloring layer on the first substrate. As shown in FIG. 1, a plurality of coloring layers may be arranged sequentially in plane with each other on the first substrate.

The coloring layer may be a sublimation transfer coloring layer, which is a coloring layer from which a sublimation dye is transferred, or a thermofusible transfer coloring layer, which is a coloring layer which itself is transferred. The thermal transfer sheet may include both a sublimation transfer coloring layer and a thermofusible transfer coloring layer.

The coloring layer contains one or more coloring materials. The coloring material may be a pigment or a dye. The dye may be a sublimation dye.

Examples of coloring materials include carbon black, acetylene black, lamp black, black smoke, iron black, aniline black, silica, calcium carbonate, titanium oxide, cadmium red, cadmopone red, chrome red, vermillion, red iron oxide, azo pigments, alizarin lake, quinacridone, cochineal lake perylene, yellow ocher, aureolin, cadmium yellow, cadmium orange, chrome yellow, zinc yellow, naples yellow, nickel yellow, azo pigments, greenish yellow, ultramarine, blue verditer, cobalt, phthalocyanine, anthraquinone, indigoid, cinnabar green, cadmium green, chrome green, phthalocyanine, azomethine, perylene, aluminum pigments, and sublimation dyes such as diarylmethane dyes, triarylmethane dyes, thiazole dyes, merocyanine dyes, pyrazolone dyes, methine dyes, indoaniline dyes, acetophenone azomethine dyes, pyrazolone azomethine dyes, xanthene dyes, oxazine dyes, thiazine dyes, azine dyes, acridine dyes, azo dyes, spiropyran dyes, indolinospiropyran dyes, fluoran dyes, naphthoquinone dyes, anthraquinone dyes, and quinophthalone dyes.

In one embodiment, the coloring layer contains one or more resin materials. Examples of resin materials include polyesters, polyamides, polyolefins, vinyl resins, vinyl acetal resins, (meth)acrylic resins, cellulose resins, styrene resins, polycarbonates, butyral resins, phenoxy resins, and ionomer resins.

The coloring layer may contain one or more additives. Examples of additives include fillers, plasticizers, ultraviolet absorbers, inorganic particles, organic particles, release agents, and dispersants.

The coloring layer preferably has a thickness of 0.1 μm or more and 3 μm or less.

The coloring layer can be formed by, for example, dispersing or dissolving the above materials in water or a suitable organic solvent, applying the resulting coating liquid to the first substrate or other layer by known means to form a coating, and drying the coating. Examples of known means include roll coating, reverse roll coating, gravure coating, reverse gravure coating, bar coating, and rod coating.

(Peel-Off Layer)

The peel-off layer is a layer for partially peeling off the transfer layer included in the intermediate transfer medium.

In one embodiment, the peel-off layer contains one or more resin materials. Examples of resin materials include polyesters, polyamides, polyolefins, vinyl resins, (meth) acrylic resins, imide resins, cellulose resins, styrene resins, polycarbonates, and ionomer resins.

From the viewpoint of peel-off properties, the peel-off layer preferably contains the same type of resin material, more preferably exactly the same type of resin material, as the receiving layer that is preferably included in the intermediate transfer medium.

In the present disclosure, "the same type of resin material" means that 50% by mass or more of the monomer forming the resin material is identical, and "exactly the same type of resin material" means that 95% by mass or more of the monomer forming the resin material is identical.

The peel-off layer may contain one or more of the above additives. The peel-off layer preferably has a thickness of 0.3 μm or more and 10 μm or less, more preferably 0.5 μm or more and 5 μm or less. This allows for a further improvement in the peel-off properties of the thermal transfer sheet.

The peel-off layer can be formed by, for example, dispersing or dissolving the above materials in water or a suitable organic solvent, applying the resulting coating liquid to the first substrate or other layer by the above known means to form a coating, and drying the coating.

(Heat Seal Layer)

The heat seal layer is a layer to be transferred from the thermal transfer sheet to the intermediate transfer medium. The heat seal layer may have a single-layer structure or a multilayer structure.

In one embodiment, the layers constituting the heat seal layer contain one or more resin materials. Examples of resin materials include polyesters, polyamides, polyolefins, vinyl resins, (meth)acrylic resins, imide resins, cellulose resins, styrene resins, polycarbonates, and ionomer resins.

In one embodiment, the heat seal layer includes a layer containing one or more types of particles. This allows mattness to be imparted to the heat seal layer, thus creating a difference in 45-degree specular gloss between the heat seal layer and the transfer layer. The heat seal layer may include two or more layers containing particles.

The particles may be organic particles, inorganic particles, or a combination thereof.

Examples of organic particles include particles (resin particles) formed of resins such as melamine resins, benzoguanamine resins, (meth)acrylic resins, polyamides, fluororesins, phenolic resins, styrene resins, polyolefins, silicone resins, and copolymers of the monomers forming these resins.

Examples of inorganic particles include clay minerals such as talc and kaolin, carbonates such as calcium carbonate and magnesium carbonate, hydroxides such as aluminum hydroxide and magnesium hydroxide, sulfates such as calcium sulfate, oxides such as silica, graphite, niter, and boron nitride.

The shape of the particles may be, for example, irregular, spherical, oval, cylindrical, or prismatic. The particles may have their surfaces treated with surface treatment agents such as silane coupling agents.

The particles preferably have an average particle size of 0.5 μm or more and 10 μm or less, more preferably 1 μm or more and 5 μm or less. This allows mattness to be imparted to the region where the transfer layer has been peeled off without decreasing the adhesion between the heat seal layer and the transfer-receiving article.

In the present disclosure, the average particle size refers to the volume average particle size and is measured in accordance with JIS Z 8819-2.

If the heat seal layer includes a layer containing particles, the value obtained by subtracting the refractive index of the resin material contained in the heat seal layer from the refractive index of the particles is preferably −0.07 or more, more preferably 0.01 or more. This allows the manufacture of a printed material partially having very high mattness. The upper limit of the value obtained by subtracting the refractive index of the resin material from the refractive index of the particles is, for example, 0.4.

In the present disclosure, the refractive indices of the particles and the resin material are measured by the critical angle method (JIS K 7142) or the V-block method (JIS B 7071-2).

The content of the particles in the layer containing the particles is preferably 10 parts by mass or more, more preferably 30 parts by mass or more, based on 100 parts by mass of the resin material. This allows the manufacture of a printed material partially having very high mattness.

From the viewpoint of ease of formation of the heat seal layer, the content of the particles is preferably 120 parts by mass or less based on 100 parts by mass of the resin material.

If the heat seal layer includes a layer containing particles, the content of particles in each layer included in the transfer layer included in the intermediate transfer medium is preferably 10 parts by mass or less, more preferably 1 part by mass or less, based on 100 parts by mass of the resin material contained in that layer, and particularly preferably, no particles are contained therein.

In one embodiment, the heat seal layer includes a layer containing one or more pearl pigments. This allows a difference in ΔL* between the heat seal layer and the transfer layer to be created. The heat seal layer may include two or more layers containing a pearl pigment.

Examples of pearl pigments include flaky alumina pigments and mica pigments each coated with metal oxides. Examples of metal oxides include oxides of titanium, iron, zirconium, silicon, aluminum, and cerium.

The content of the pearl pigment in the layer containing the pearl pigment is not particularly limited as long as the difference in pearl pigment content between the heat seal layer and the transfer layer can be satisfied as described above in one embodiment. Preferably, the content of the pearl pigment in the layer containing the pearl pigment is 10 parts by mass or more, more preferably 30 parts by mass or more, based on 100 parts by mass of the resin material. This allows the manufacture of a printed material partially having very high pearliness.

From the viewpoint of ease of formation of the heat seal layer, the content of the pearl pigment is preferably 120 parts by mass or less based on 100 parts by mass of the resin material.

If the heat seal layer includes a layer containing a pearl pigment, the content of a pearl pigment in each layer included in the transfer layer included in the intermediate transfer medium is preferably 10 parts by mass or less, more preferably 1 part by mass or less, based on 100 parts by mass of the resin material contained in that layer, and particularly preferably, no pearl pigment is contained therein.

In one embodiment, the heat seal layer includes a layer containing one or more metallic pigments. This allows a difference in average specular reflectance between the heat seal layer and the transfer layer to be created. The heat seal layer may include two or more layers containing a metallic pigment.

Examples of metallic pigments include aluminum, nickel, chromium, brass, tin, brass, bronze, zinc, silver, platinum, gold, and oxides thereof as well as particles, such as glass particles, subjected to metal deposition.

The content of the metallic pigment in the layer containing the metallic pigment is not particularly limited as long as the difference in metallic pigment content between the heat seal layer and the transfer layer can be satisfied as described above in one embodiment. Preferably, the content of the metallic pigment in the layer containing the metallic pigment is 10 parts by mass or more, more preferably 30 parts by mass or more, based on 100 parts by mass of the resin material. This allows the manufacture of a printed material partially having a very high level of metallic luster.

From the viewpoint of ease of formation of the heat seal layer, the content of the metallic pigment is preferably 120 parts by mass or less based on 100 parts by mass of the resin material.

If the heat seal layer includes a layer containing a metallic pigment, the content of a metallic pigment in each layer included in the transfer layer included in the intermediate transfer medium is preferably 10 parts by mass or less, more preferably 1 part by mass or less, based on 100 parts by mass of the resin material contained in that layer, and particularly preferably, no metallic pigment is contained therein.

In one embodiment, the heat seal layer includes a layer containing one or more types of foaming particles. This allows a difference in surface roughness between the heat seal layer and the transfer layer to be created. The heat seal layer may include two or more layers containing foaming particles.

As the foaming particles, for example, thermally expandable microcapsules containing a volatile substance can be used. Examples of materials that form the shell of the thermally expandable microcapsules include polyolefins such as polyethylene, (meth)acrylic resins, styrene resins, vinyl resins such as polyvinyl acetate and polyvinyl chloride, polyamides, and polyesters. Examples of volatile substances contained in the shell include propane, butene, isobutane, isopentene, neopentene, hexane, heptane, methyl chloride, and tetramethylsilane.

The content of the foaming particles in the layer containing the foaming particles is not particularly limited as long as the difference in foaming particle content between the heat seal layer and the transfer layer can be satisfied as described above in one embodiment. Preferably, the content of the foaming particles in the layer containing the foaming particles is 10 parts by mass or more, more preferably 30 parts by mass or more, based on 100 parts by mass of the resin material. This allows the manufacture of a printed material partially having a very high level of stereoscopic effect.

From the viewpoint of ease of formation of the heat seal layer, the content of the foaming particles is preferably 120 parts by mass or less based on 100 parts by mass of the resin material.

If the heat seal layer includes a layer containing foaming particles, the content of foaming particles in each layer included in the transfer layer included in the intermediate transfer medium is preferably 10 parts by mass or less, more preferably 1 part by mass or less, based on 100 parts by mass of the resin material contained in that layer, and particularly preferably, no foaming particles are contained therein.

The heat seal layer may contain one or more of the above additives.

The heat seal layer preferably has a thickness of 0.3 μm or more and 20 μm or less, more preferably 0.5 μm or more and 10 μm or less.

The heat seal layer can be formed by, for example, dispersing or dissolving the above materials in water or a suitable organic solvent, applying the resulting coating liquid to the first substrate or other layer by the above known means to form a coating, and drying the coating.

The heat seal layer may include a layer containing two or more selected from particles, pearl pigments, metallic pigments, and foaming particles. The heat seal layer may include two or more layers containing a material selected from particles, pearl pigments, metallic pigments, and foaming particles, and each layer may contain a different material. For example, the heat seal layer may include one layer containing particles and one layer containing a pearl pigment.

(Primer Layer)

In one embodiment, the thermal transfer sheet of the present disclosure includes a primer layer between the first substrate and the coloring layer and/or between the first substrate and the peel-off layer. This allows for an improvement in the adhesion between these layers.

In one embodiment, the primer layer contains one or more resin materials. Examples of resin materials include polyesters, vinyl resins, polyurethanes, (meth)acrylic resins, polyamides, polyethers, styrene resins, and cellulose resins.

The primer layer preferably has a thickness of 0.1 μm or more and 2.0 μm or less.

The primer layer can be formed by, for example, dispersing or dissolving the above materials in water or a suitable organic solvent, applying the resulting coating liquid to the first substrate by the above known means to form a coating, and drying the coating.

(Release Layer)

In one embodiment, the thermal transfer sheet of the present disclosure includes a release layer between the first substrate and the heat seal layer. This allows for an improvement in the transferability of the heat seal layer. The release layer remains on the substrate side after transfer.

In one embodiment, the release layer contains one or more resin materials. Examples of resin materials include (meth) acrylic resins, polyurethanes, acetal resins, polyamides, polyesters, melamine resins, polyol resins, cellulose resins, and silicone resins.

In one embodiment, the release layer contains one or more release agents. Examples of release agents include silicone oils, phosphate plasticizers, fluorine-containing compounds, waxes, metallic soaps, and particles.

The release layer preferably has a thickness of 0.2 μm or more and 2.0 μm or less.

The release layer can be formed by, for example, dispersing or dissolving the above materials in water or a suitable organic solvent, applying the resulting coating liquid to the first substrate by the above known means to form a coating, and drying the coating.

(Back Layer)

In one embodiment, the thermal transfer sheet of the present disclosure includes a back layer on the opposite surface of the first substrate from the surface on which the layers such as the coloring layer are disposed. This allows sticking and formation of wrinkles due to heating to be inhibited during thermal transfer.

In one embodiment, the back layer contains one or more resin materials. Examples of resin materials include vinyl resins, polyesters, polyamides, polyolefins, (meth)acrylic resins, polyolefins, polyurethanes, cellulose resins, and phenolic resins.

The back layer preferably has a thickness of 0.3 μm or more and 3.0 μm or less.

The back layer can be formed by, for example, dispersing or dissolving the above materials in water or a suitable organic solvent, applying the resulting coating liquid to the first substrate by the above known means to form a coating, and drying the coating.

(Intermediate Transfer Medium)

The intermediate transfer medium includes a second substrate and a transfer layer. In one embodiment, the transfer layer includes a peeling layer and a receiving layer. In one embodiment, the transfer layer includes a protective layer between the peeling layer and the receiving layer.

(Second Substrate)

As the second substrate, a suitable material that can be used for the first substrate can be selected and used.

(Peeling Layer)

The peeling layer is a layer to be transferred from the intermediate transfer medium to the transfer-receiving article and is a layer to be located at the outermost surface of a printed material.

The peeling layer contains one or more resin materials. Examples of resin materials include polyesters, polyamides, polyolefins, vinyl resins, (meth)acrylic resins, imide resins, cellulose resins, styrene resins, polycarbonates, and ionomer resins.

In one embodiment, the peeling layer contains one or more of the types of particles described above in the (Heat Seal Layer) section.

If the peeling layer contains particles, the value obtained by subtracting the refractive index of the resin material contained in the peeling layer from the refractive index of the particles is preferably −0.07 or more, more preferably 0.01 or more. This allows the manufacture of a printed material partially having very high mattness. The upper limit of the value obtained by subtracting the refractive index of the resin material from the refractive index of the particles is, for example, 0.4.

The content of the particles in the peeling layer is preferably 10 parts by mass or more, more preferably 30 parts by mass or more, based on 100 parts by mass of the resin material. This allows the manufacture of a printed material partially having very high mattness.

From the viewpoint of ease of formation of the peeling layer, the content of the particles is preferably 120 parts by mass or less based on 100 parts by mass of the resin material.

If the peeling layer contains particles, the content of particles in the heat seal layer included in the thermal transfer sheet is preferably 10 parts by mass or less, more preferably 1 part by mass or less, based on 100 parts by mass of the resin material contained in the heat seal layer, and particularly preferably, no particles are contained therein.

In one embodiment, the peeling layer contains one or more of the above pearl pigments.

The content of the pearl pigment in the peeling layer is not particularly limited as long as the difference in pearl pigment content between the heat seal layer and the transfer layer can be satisfied as described above in one embodiment. Preferably, the content of the pearl pigment in the peeling layer is 10 parts by mass or more, more preferably 30 parts by mass or more, based on 100 parts by mass of the resin material. This allows the manufacture of a printed material partially having very high pearliness.

From the viewpoint of ease of formation of the peeling layer, the content of the pearl pigment is preferably 120 parts by mass or less based on 100 parts by mass of the resin material.

If the peeling layer contains a pearl pigment, the content of a pearl pigment in the heat seal layer included in the thermal transfer sheet is preferably 10 parts by mass or less, more preferably 1 part by mass or less, based on 100 parts by mass of the resin material contained in the heat seal layer, and particularly preferably, no pearl pigment is contained therein.

In one embodiment, the peeling layer contains one or more of the above metallic pigments.

The content of the metallic pigment in the peeling layer is not particularly limited as long as the difference in metallic pigment content between the heat seal layer and the transfer layer can be satisfied as described above in one embodiment. Preferably, the content of the metallic pigment in the peeling layer is 10 parts by mass or more, more preferably 30 parts by mass or more, based on 100 parts by mass of the resin material. This allows the manufacture of a printed material partially having a very high level of metallic luster.

From the viewpoint of ease of formation of the peeling layer, the content of the metallic pigment is preferably 120 parts by mass or less based on 100 parts by mass of the resin material.

If the peeling layer contains a metallic pigment, the content of a metallic pigment in the heat seal layer included in the thermal transfer sheet is preferably 10 parts by mass or less, more preferably 1 part by mass or less, based on 100 parts by mass of the resin material contained in the heat seal layer, and particularly preferably, no metallic pigment is contained therein.

In one embodiment, the peeling layer contains one or more of the above types of foaming particles.

The content of the foaming particles in the peeling layer is not particularly limited as long as the difference in foaming particle content between the heat seal layer and the transfer layer can be satisfied as described above in one embodiment. Preferably, the content of the foaming particles in the peeling layer is 10 parts by mass or more, more preferably 30 parts by mass or more, based on 100 parts by mass of the resin material. This allows the manufacture of a printed material partially having a very high level of stereoscopic effect.

From the viewpoint of ease of formation of the peeling layer, the content of the foaming particles is preferably 120 parts by mass or less based on 100 parts by mass of the resin material.

If the peeling layer contains foaming particles, the content of foaming particles in the heat seal layer included in the thermal transfer sheet is preferably 10 parts by mass or less, more preferably 1 part by mass or less, based on 100 parts by mass of the resin material contained in the heat seal layer, and particularly preferably, no foaming particles are contained therein.

In one embodiment, the peeling layer contains one or more waxes. Examples of waxes include natural waxes such as beeswax, spermaceti, Japan wax, rice bran wax, Carnauba wax, Candelilla wax, and montan wax; synthetic waxes such as paraffin wax, microcrystalline wax, oxidized wax, ozokerite, ceresin, ester wax, and polyethylene wax; higher saturated fatty acids such as margaric acid, lauric acid, myristic acid, palmitic acid, stearic acid, furoic acid, and behenic acid; higher saturated monohydric alcohols such as stearyl alcohol and behenyl alcohol; higher esters such as sorbitan fatty acid ester; and higher fatty acid amides such as stearamide and oleamide.

The peeling layer may contain one or more of the above additives.

The peeling layer preferably has a thickness of 0.3 μm or more and 20 μm or less, more preferably 0.5 μm or more and 10 μm or less.

The peeling layer can be formed by, for example, dispersing or dissolving the above materials in water or a suitable organic solvent, applying the resulting coating liquid to the second substrate by the above known means to form a coating, and drying the coating.

(Receiving Layer)

In one embodiment, the receiving layer contains one or more resin materials. Examples of resin materials include polyolefins, vinyl resins such as polyvinyl chloride and vinyl chloride-vinyl acetate copolymers, (meth)acrylic resins, cellulose resins, polyesters, polyamides, polycarbonates, styrene resins, epoxy resins, polyurethanes, epoxy resins, and ionomer resins.

In one embodiment, the receiving layer contains one or more release agents. This allows for an improvement in the releasability from the thermal transfer sheet.

Examples of release agents include solid waxes such as polyethylene wax, polyamide wax, and Teflon (registered trademark) powder, fluorinated or phosphonate surfactants, silicone oils, various modified silicone oils such as reactive silicone oils and curable silicone oils, and silicone resins.

Although the above silicone oils may be used in oil form, modified silicone oil are preferred. Preferred examples of modified silicone oils include amino-modified silicones, epoxy-modified silicones, aralkyl-modified silicones, epoxy-aralkyl-modified silicones, alcohol-modified silicones, vinyl-modified silicones, and urethane-modified silicones, particularly preferably epoxy-modified silicones, aralkyl-modified silicones, and epoxy-aralkyl-modified silicones.

In one embodiment, the receiving layer contains one or more of the types of particles described above in the (Heat Seal Layer) section.

If the receiving layer contains particles, the value obtained by subtracting the refractive index of the resin material contained in the receiving layer from the refractive index of the particles is preferably −0.07 or more, more preferably 0.01 or more. This allows the manufacture of a printed material partially having very high mattness. The upper limit of the value obtained by subtracting the refractive index of the resin material from the refractive index of the particles is, for example, 0.4.

The content of the particles in the receiving layer is preferably 10 parts by mass or more, more preferably 30 parts by mass or more, based on 100 parts by mass of the resin material. This allows the manufacture of a printed material partially having very high mattness.

From the viewpoint of ease of formation of the receiving layer, the content of the particles is preferably 120 parts by mass or less based on 100 parts by mass of the resin material.

If the receiving layer contains particles, the content of particles in the heat seal layer included in the thermal transfer sheet is preferably 10 parts by mass or less, more preferably 1 part by mass or less, based on 100 parts by mass of the resin material contained in the heat seal layer, and particularly preferably, no particles are contained therein.

In one embodiment, the receiving layer contains one or more of the above pearl pigments.

The content of the pearl pigment in the receiving layer is not particularly limited as long as the difference in pearl pigment content between the heat seal layer and the transfer layer can be satisfied as described above in one embodiment. Preferably, the content of the pearl pigment in the receiving layer is 10 parts by mass or more, more preferably 30 parts by mass or more, based on 100 parts by mass of the resin material. This allows the manufacture of a printed material partially having very high pearliness.

From the viewpoint of ease of formation of the receiving layer, the content of the pearl pigment is preferably 120 parts by mass or less based on 100 parts by mass of the resin material.

If the receiving layer contains a pearl pigment, the content of a pearl pigment in the heat seal layer included in the thermal transfer sheet is preferably 10 parts by mass or less, more preferably 1 part by mass or less, based on 100 parts by mass of the resin material contained in the heat seal layer, and particularly preferably, no pearl pigment is contained therein.

In one embodiment, the receiving layer contains one or more of the above metallic pigments.

The content of the metallic pigment in the receiving layer is not particularly limited as long as the difference in metallic pigment content between the heat seal layer and the transfer layer can be satisfied as described above in one embodiment. Preferably, the content of the metallic pigment in the receiving layer is 10 parts by mass or more, more preferably 30 parts by mass or more, based on 100 parts by mass of the resin material. This allows the manufacture of a printed material partially having a very high level of metallic luster.

From the viewpoint of ease of formation of the receiving layer, the content of the metallic pigment is preferably 120 parts by mass or less based on 100 parts by mass of the resin material.

If the receiving layer contains a metallic pigment, the content of a metallic pigment in the heat seal layer included in the thermal transfer sheet is preferably 10 parts by mass or less, more preferably 1 part by mass or less, based on 100 parts by mass of the resin material contained in the heat seal layer, and particularly preferably, no metallic pigment is contained therein.

In one embodiment, the receiving layer contains one or more of the above types of foaming particles.

The content of the foaming particles in the receiving layer is not particularly limited as long as the difference in foaming particle content between the heat seal layer and the transfer layer can be satisfied as described above in one embodiment. Preferably, the content of the foaming particles in the receiving layer is 10 parts by mass or more, more preferably 30 parts by mass or more, based on 100 parts by mass of the resin material. This allows the manufacture of a printed material partially having a very high level of stereoscopic effect.

From the viewpoint of ease of formation of the receiving layer, the content of the foaming particles is preferably 120 parts by mass or less based on 100 parts by mass of the resin material.

If the receiving layer contains foaming particles, the content of foaming particles in the heat seal layer included in the thermal transfer sheet is preferably 10 parts by mass or less, more preferably 1 part by mass or less, based on 100 parts by mass of the resin material contained in the heat seal layer, and particularly preferably, no foaming particles are contained therein.

The receiving layer may contain one or more of the above additives.

The receiving layer preferably has a thickness of 0.5 μm or more and 20 μm or less, more preferably 1 μm or more and 10 μm or less. This allows for an improvement in the density of an image formed on the receiving layer.

The receiving layer can be formed by, for example, dispersing or dissolving the above materials in water or a suitable organic solvent, applying the resulting coating liquid to any layer such as the second substrate by the above known means to form a coating, and drying the coating.

(Protective Layer)

In one embodiment, the transfer layer included in the intermediate transfer medium includes a protective layer between the peeling layer and the receiving layer.

In one embodiment, the protective layer contains one or more resin materials. Examples of resin materials include polyesters, (meth)acrylic resins, epoxy resins, styrene resins, acrylic polyol resins, polyurethanes, ionizing-radiation curable resins, and ultraviolet-absorbing resins.

In one embodiment, the protective layer contains one or more isocyanate compounds. Examples of isocyanate compounds include xylene diisocyanate, toluene diisocyanate, isophorone diisocyanate, and hexamethylene diisocyanate.

In one embodiment, the protective layer contains one or more of the types of particles described above in the (Heat Seal Layer) section.

If the protective layer contains particles, the value obtained by subtracting the refractive index of the resin material contained in the protective layer from the refractive index of the particles is preferably −0.07 or more, more preferably 0.01 or more. This allows the manufacture of a printed material partially having very high mattness. The upper limit of the value obtained by subtracting the refractive index of the resin material from the refractive index of the particles is, for example, 0.4.

The content of the particles in the protective layer is preferably 10 parts by mass or more, more preferably 30 parts by mass or more, based on 100 parts by mass of the resin material. This allows the manufacture of a printed material partially having very high mattness.

From the viewpoint of ease of formation of the protective layer, the content of the particles is preferably 120 parts by mass or less based on 100 parts by mass of the resin material.

If the protective layer contains particles, the content of particles in the heat seal layer included in the thermal transfer sheet is preferably 10 parts by mass or less, more preferably 1 part by mass or less, based on 100 parts by mass of the resin material contained in the heat seal layer, and particularly preferably, no particles are contained therein.

In one embodiment, the protective layer contains one or more of the above pearl pigments.

The content of the pearl pigment in the protective layer is not particularly limited as long as the difference in pearl pigment content between the heat seal layer and the transfer layer can be satisfied as described above in one embodiment. Preferably, the content of the pearl pigment in the protective layer is 10 parts by mass or more, more preferably 30 parts by mass or more, based on 100 parts by mass of the resin material. This allows the manufacture of a printed material partially having very high pearliness.

From the viewpoint of ease of formation of the protective layer, the content of the pearl pigment is preferably 120 parts by mass or less based on 100 parts by mass of the resin material.

If the protective layer contains a pearl pigment, the content of a pearl pigment in the heat seal layer included in the thermal transfer sheet is preferably 10 parts by mass or less, more preferably 1 part by mass or less, based on 100 parts by mass of the resin material contained in the heat seal layer, and particularly preferably, no pearl pigment is contained therein.

In one embodiment, the protective layer contains one or more of the above metallic pigments.

The content of the metallic pigment in the protective layer is not particularly limited as long as the difference in metallic pigment content between the heat seal layer and the transfer layer can be satisfied as described above in one embodiment. Preferably, the content of the metallic pigment in the protective layer is 10 parts by mass or more, more preferably 30 parts by mass or more, based on 100 parts by mass of the resin material. This allows the manufacture of a printed material partially having a very high level of metallic luster.

From the viewpoint of ease of formation of the protective layer, the content of the metallic pigment is preferably 120 parts by mass or less based on 100 parts by mass of the resin material.

If the protective layer contains a metallic pigment, the content of a metallic pigment in the heat seal layer included in the thermal transfer sheet is preferably 10 parts by mass or less, more preferably 1 part by mass or less, based on 100 parts by mass of the resin material contained in the heat seal layer, and particularly preferably, no metallic pigment is contained therein.

In one embodiment, the protective layer contains one or more of the above types of foaming particles.

The content of the foaming particles in the protective layer is not particularly limited as long as the difference in foaming particle content between the heat seal layer and the transfer layer can be satisfied as described above in one embodiment. Preferably, the content of the foaming particles in the protective layer is 10 parts by mass or more, more preferably 30 parts by mass or more, based on 100 parts by mass of the resin material. This allows the manufacture of a printed material partially having a very high level of stereoscopic effect.

From the viewpoint of ease of formation of the protective layer, the content of the foaming particles is preferably 120 parts by mass or less based on 100 parts by mass of the resin material.

If the protective layer contains foaming particles, the content of foaming particles in the heat seal layer included in the thermal transfer sheet is preferably 10 parts by mass or less, more preferably 1 part by mass or less, based on 100 parts by mass of the resin material contained in the heat seal layer, and particularly preferably, no foaming particles are contained therein.

The protective layer may contain one or more of the above additives.

The protective layer preferably has a thickness of 0.5 μm or more and 7 μm or less, more preferably 1 μm or more and 5 μm or less. This allows for a further improvement in the durability of the protective layer.

The protective layer can be formed by, for example, dispersing or dissolving the above materials in water or a suitable organic solvent, applying the resulting coating liquid to the peeling layer by the above known means to form a coating, and drying the coating.

The transfer layer may include a layer containing two or more selected from particles, pearl pigments, metallic pigments, and foaming particles. The transfer layer may include two or more layers containing a material selected from particles, pearl pigments, metallic pigments, and foaming particles, and each layer may contain a different material. For example, the peeling layer may contain particles, whereas the receiving layer may contain a pearl pigment.

[Method for Manufacturing Printed Material]

The steps included in a method for manufacturing the printed material of the present disclosure will be described below.

(Step of Providing Thermal Transfer Sheet and Intermediate Transfer Medium)

Figure 2:
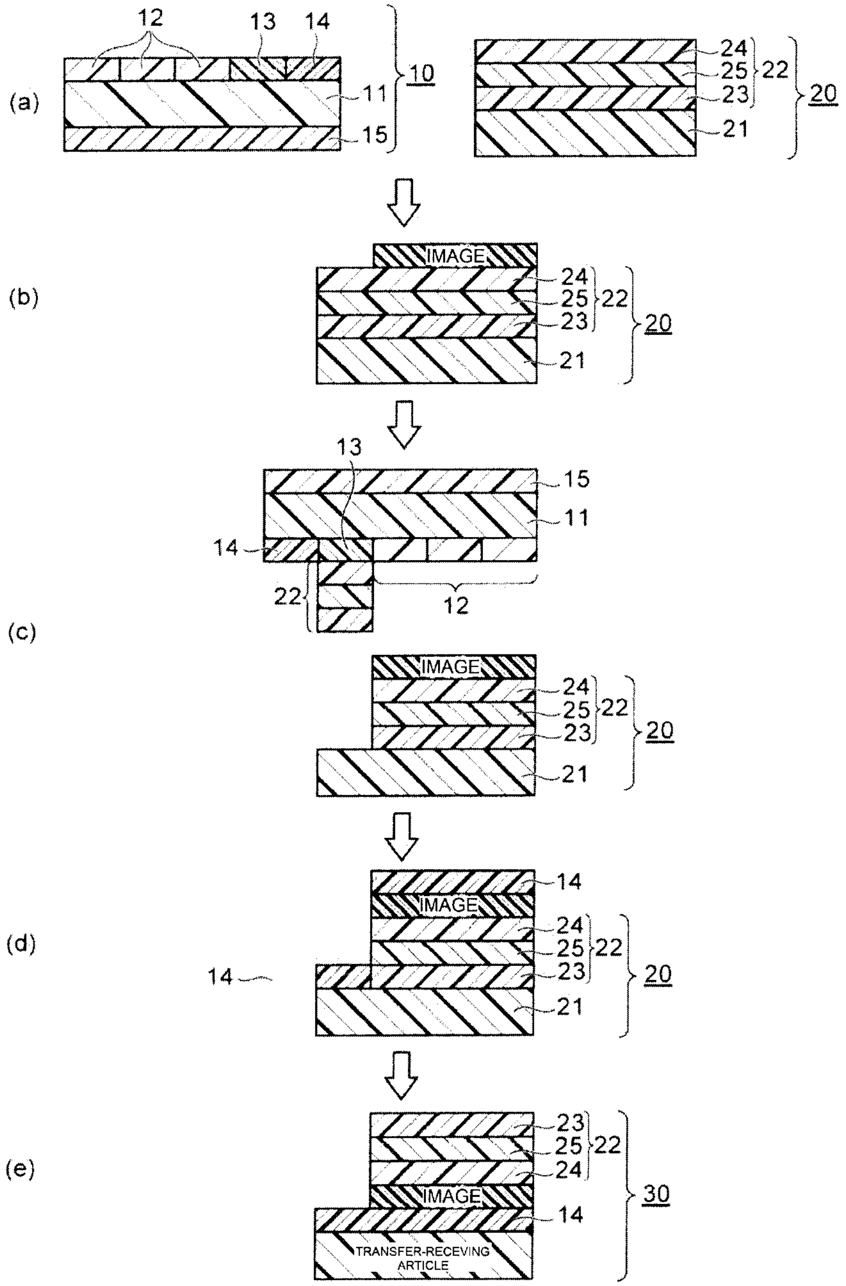
FIG. 2 shows schematic views for illustrating a method for manufacturing a printed material of the present disclosure.

The method for manufacturing the printed material of the present disclosure includes a step of providing a combination of a thermal transfer sheet and an intermediate transfer medium (see FIG. 2(*a*)). The thermal transfer sheet includes a first substrate and a coloring layer, a peel-off layer, and a heat seal layer disposed on the first substrate. The intermediate transfer medium includes a second substrate and a transfer layer.

Specific examples, preferred examples, and methods for fabrication of thermal transfer sheets and intermediate transfer media are preferably as described above; therefore, a description thereof is omitted herein. The above combination is preferably the combination of the present disclosure described above.

(Image Forming Step)

The method for manufacturing the printed material of the present disclosure includes a step of forming an image on the transfer layer included in the intermediate transfer medium (see FIG. 2(*b*)). The image may be formed using the above thermal transfer sheet or a different thermal transfer sheet.

(Peel-Off Step)

The method for manufacturing the printed material of the present disclosure includes a step of heating and pressure-bonding together a portion of the transfer layer included in the intermediate transfer medium and at least a portion of the peel-off layer included in the thermal transfer sheet and then peeling off the heated and pressure-bonded portion of the transfer layer from the intermediate transfer medium (see FIG. 2(*c*)).

Peel-off in this step is to remove a portion of the transfer layer and is clearly distinguished from transfer in the step of transfer to a transfer-receiving article, described below.

The region of the intermediate transfer medium from which the transfer layer is to be peeled off is hereinafter also referred to as "region to be removed". The transfer layer in the region to be removed may have no image formed thereon or may have an image formed thereon. That is, the portion to be peeled off of the transfer layer may have no image formed thereon or may have an image formed thereon.

In one embodiment, the transfer layer disposed in the region to be removed of the intermediate transfer medium can be peeled off by stacking together the transfer layer included in the intermediate transfer medium and the peel-off layer included in the thermal transfer sheet in at least a portion of the region to be removed, pressure-bonding the thermal transfer sheet while heating it from the back layer side, for example, using a thermal head, and then peeling the thermal transfer sheet.

In this step, the transfer layer and the peel-off layer are preferably heated and pressure-bonded over the entire region to be removed. This allows the transfer layer disposed in the region to be removed to be more accurately peeled off.

(Step of Transferring Heat Seal Layer)

The method for manufacturing the printed material of the present disclosure includes a step of transferring the heat seal layer from the thermal transfer sheet to a region of the intermediate transfer medium where the transfer layer has not been peeled off (hereinafter also referred to as "unremoved region") and a region of the intermediate transfer medium where the transfer layer has been peeled off (hereinafter also referred to as "removed region") (see FIG. 2(*d*)). The transfer may be performed by a conventionally known method using a commercially available thermal transfer printer.

In this step, for example, the heat seal layer is transferred to the transfer layer having the image formed on at least a portion thereof in the unremoved region and to the second substrate in the removed region.

By transferring the heat seal layer, the transferability of the transfer layer to a transfer-receiving article can be improved near the removed region. Thus, a transfer defect can be inhibited in a method for manufacturing a printed material which includes a step of removing a portion of the transfer layer from the intermediate transfer medium using the combination of the thermal transfer sheet and the intermediate transfer medium.

(Step of Transfer to Transfer-Receiving Article)

The method for manufacturing the printed material of the present disclosure includes a step of transferring, to a transfer-receiving article, the transfer layer having the image formed on at least a portion thereof and the transferred heat seal layer in the unremoved region of the intermediate transfer medium and the transferred heat seal layer in the removed region of the intermediate transfer medium (see FIG. 2(*e*)). The transfer may be performed by a conventionally known method using a commercially available thermal transfer printer.

A suitable transfer-receiving article can be selected and used depending on use. For example, paper substrates such as wood-free paper, art paper, coated paper, resin-coated paper, cast-coated paper, paperboard, synthetic paper, and impregnated paper as well as the above resin films can be used.

[Printed Material]

Figure 3:
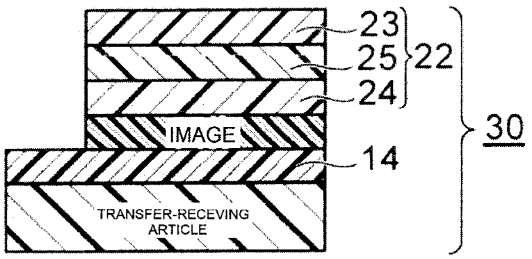
FIG. 3 is a schematic sectional view of a printed material of the present disclosure.

As described above, the transfer layer included in the intermediate transfer medium has been selectively peeled off, and a printed material 30 of the present disclosure (see FIG. 3) includes a region to which the transfer layer has been transferred from the intermediate transfer medium and a region to which the transfer layer has not been transferred. The region to which the transfer layer has been transferred is a raised portion and can impart a stereoscopic effect to the printed material.

A printed material whose texture differs partially or a printed material with a greater stereoscopic effect can be obtained by using different compositions for the transfer layer transferred from the intermediate transfer medium and the heat seal layer located as the outermost layer in the region to which the transfer layer has not been transferred.

The present disclosure relates to, for example, [1] to [10] below:

[1] A combination of a thermal transfer sheet and an intermediate transfer medium, wherein the thermal transfer sheet includes a first substrate and a coloring layer, a peel-off layer, and a heat seal layer disposed on the first substrate, the intermediate transfer medium includes a second substrate and a transfer layer, the peel-off layer is a layer for removing a portion of the transfer layer from the intermediate transfer medium, and an absolute value of a difference in 45-degree specular gloss between the heat seal layer and the transfer layer is 20% or more.

[2] A combination of a thermal transfer sheet and an intermediate transfer medium, wherein the thermal transfer sheet includes a first substrate and a coloring layer, a peel-off layer, and a heat seal layer disposed on the first substrate, the intermediate transfer medium includes a second substrate and a transfer layer, the peel-off layer is a layer for removing a portion of the transfer layer from the intermediate transfer medium, and an absolute value of a difference between $\Delta L^*_{HS}$ and $\Delta L^*_{T}$ is 5 or more and 30 or less, where $\Delta L^*_{HS}$ is an absolute value of a difference between L* values at angles of acceptance of 110 degrees and 15 degrees with respect to an angle of specular reflection for an angle of incidence of light when the light is incident on the heat seal layer at an angle of incidence of 45 degrees, and $\Delta L^*_{T}$ is an absolute value of a difference between L* values at angles of acceptance of 110 degrees and 15 degrees with respect to an angle of specular reflection for an angle of incidence of light when the light is incident on the transfer layer at an angle of incidence of 45 degrees.

[3] The combination of the thermal transfer sheet and the intermediate transfer medium according to [2] above, wherein at least one layer selected from the heat seal layer and the transfer layer contains a pearl pigment, and an absolute value of a difference between a content of the pearl pigment in the heat seal layer and a content of the pearl pigment in the transfer layer is 10% by mass or more.

[4] A combination of a thermal transfer sheet and an intermediate transfer medium, wherein the thermal transfer sheet includes a first substrate and a coloring layer, a peel-off layer, and a heat seal layer disposed on the first substrate, the intermediate transfer medium includes a second substrate and a transfer layer, the peel-off layer is a layer for removing a portion of the transfer layer from the intermediate transfer medium, and an absolute value of a difference between $R_{HS}$ and $R_T$ is 20% or more and 50% or less, where $R_{HS}$ is an average specular reflectance for light incident on the heat seal layer under conditions of an angle of incidence of 5 degrees and a measurement wavelength range of 400 nm or more and 700 nm or less, and $R_T$ is an average specular reflectance for light incident on the transfer layer under the above conditions.

[5] The combination of the thermal transfer sheet and the intermediate transfer medium according to [4] above, wherein at least one layer selected from the heat seal layer and the transfer layer contains a metallic pigment, and an absolute value of a difference between a content of the metallic pigment in the heat seal layer and a content of the metallic pigment in the transfer layer is 10% by mass or more.

[6] A combination of a thermal transfer sheet and an intermediate transfer medium, wherein the thermal transfer sheet includes a first substrate and a coloring layer, a peel-off layer, and a heat seal layer disposed on the first substrate, the intermediate transfer medium includes a second substrate and a transfer layer, the peel-off layer is a layer for removing a portion of the transfer layer from the intermediate transfer medium, and an absolute value of a difference between a surface roughness ($Ra_{HS}$) of the heat seal layer and a surface roughness ($Ra_{T}$) of the transfer layer is 0.5 μm or more and 3.0 μm or less.

[7] The combination of the thermal transfer sheet and the intermediate transfer medium according to [6] above, wherein at least one layer selected from the heat seal layer and the transfer layer contains foaming particles, and an absolute value of a difference between a content of the foaming particles in the heat seal layer and a content of the foaming particles in the transfer layer is 10% by mass or more.

[8] A method for manufacturing a printed material, including the steps of:

providing a combination of a thermal transfer sheet and an intermediate transfer medium, the thermal transfer sheet including a first substrate and a coloring layer, a peel-off layer, and a heat seal layer disposed on the first substrate, the intermediate transfer medium including a second substrate and a transfer layer;

forming an image on the transfer layer included in the intermediate transfer medium;

heating and pressure-bonding together a portion of the transfer layer included in the intermediate transfer medium and at least a portion of the peel-off layer included in the thermal transfer sheet and then peeling off the heated and pressure-bonded portion of the transfer layer from the intermediate transfer medium;

transferring the heat seal layer from the thermal transfer sheet to a region of the intermediate transfer medium where the transfer layer has not been peeled off and a region of the intermediate transfer medium where the transfer layer has been peeled off; and transferring, to a transfer-receiving article, the transfer layer having the image formed on at least a portion thereof and the transferred heat seal layer in the region of the intermediate transfer medium where the transfer layer has not been peeled off, and the transferred heat seal layer in the region of the intermediate transfer medium where the transfer layer has been peeled off.

[9] The method for manufacturing a printed material according to [8] above, wherein the combination of the thermal transfer sheet and the intermediate transfer medium is the combination of the thermal transfer sheet and the intermediate transfer medium according to any one of [1] to [7] above.

[10] A printed material manufactured using a combination of a thermal transfer sheet and an intermediate transfer medium, the thermal transfer sheet including a first substrate and a coloring layer, a peel-off layer, and a heat seal layer disposed on the first substrate, the intermediate transfer medium including a second substrate and a transfer layer, the peel-off layer being a layer for removing a portion of the transfer layer from the intermediate transfer medium, the printed material including:

a transfer-receiving article;

the heat seal layer disposed on the transfer-receiving article; and the transfer layer disposed on a portion of the heat seal layer and having an image formed thereon.

EXAMPLES

Next, the combination and the like of the present disclosure will be more specifically described with reference to examples, although the combination and the like of the present disclosure are not limited to these examples.

(Method for Measuring Refractive Index)

The refractive indices of resin materials and particles were measured using a refractive index meter (KPR-30 manufactured by Shimadzu Corporation).

(Method for Measuring 45-Degree Specular Gloss)

The 45-degree specular gloss was measured in accordance with a method for measuring 45-degree specular gloss described in JIS Z 8741 using a gloss meter (VG 7000 manufactured by Nippon Denshoku Industries Co., Ltd.).

(Method for Measuring ΔL*)

ΔL* between angles of acceptance of 110 degrees and 15 degrees refers to the absolute value of the difference between L* at an angle of acceptance of 110 degrees and L* at an angle of acceptance of 15 degrees as measured and calculated in accordance with JIS-Z-8781-4 (2013) using a goniophotometer. The goniophotometer used was GC-2000 (Nippon Denshoku Industries Co., Ltd.). Incident light was set such that L* at the angle of specular reflection was 79 or more and 81 or less when the light was incident on a white standard plate at an angle of incidence of 45 degrees. The white standard plate used was a genuine standard plate accompanying the above goniophotometer (GC-2000, Nippon Denshoku Industries Co., Ltd.). The wavelength was that of a D65 light source (viewing angle: 2°).

(Method for Measuring Specular Reflectance)

The specular reflectance was measured using a spectrophotometer (Solid Spec 3700DUV, Shimadzu Corporation) for the heat seal layer and the transfer layer. As the measurement conditions, the specular reflectance (absolute reflectance) was measured at an angle of incidence of 5 degrees in the wavelength range of 400 nm or more and 700 nm or less in steps of 1 nm, and the average specular reflectance over this wavelength range was calculated.

(Method for Measuring Surface Roughness Ra)

The surface roughness Ra, which is the arithmetic average roughness, was measured in accordance with JIS B 0601 using a laser microscope with a surface roughness measuring function (the trade name VK-X150 manufactured by Keyence Corporation).

Example 1

[Fabrication of Thermal Transfer Sheet]

A PET film having a thickness of 6 μm was provided as a first substrate. Primer Layer Forming Coating Liquid A having the following composition was applied to one surface of the first substrate and was dried to form Primer Layer A having a thickness of 0.15 μm. Sublimation Transfer Coloring Layer Forming Coating Liquids A, B, and C having the following compositions were then applied to Primer Layer A sequentially in plane and were dried to form Sublimation Transfer Coloring Layers A to C, each having a thickness of 0.7 μm.

| <Primer Layer Forming Coating Liquid A> | |
|---|---|
| Alumina sol (Alumina Sol 200 manufactured by Nissan Chemical Corporation, solid content: 10.5%) | 50 parts by mass |
| Vinylpyrrolidone-vinyl acetate copolymer (PVP/VA E-335 manufactured by ISP Japan Ltd., solid content: 50%) | 4 parts by mass |

| <Coloring Layer Forming Coating Liquid A> | |
|---|---|
| Yellow sublimation dye | 6 parts by mass |
| Polyvinyl acetal (S-LEC (registered trademark) KS-6 manufactured by Sekisui Chemical Co., Ltd.) | 4 parts by mass |
| Methyl ethyl ketone (MEK) | 45 parts by mass |
| Toluene | 45 parts by mass |

| <Coloring Layer Forming Coating Liquid B> | |
|---|---|
| Magenta sublimation dye | 6 parts by mass |
| Polyvinyl acetal (S-LEC (registered trademark) KS-6 manufactured by Sekisui Chemical Co., Ltd.) | 4 parts by mass |
| MEK | 45 parts by mass |
| Toluene | 45 parts by mass |

| <Coloring Layer Forming Coating Liquid C> | |
|---|---|
| Cyan sublimation dye | 6 parts by mass |
| Polyvinyl acetal (S-LEC (registered trademark) KS-6 manufactured by Sekisui Chemical Co., Ltd.) | 4 parts by mass |
| MEK | 45 parts by mass |
| Toluene | 45 parts by mass |

Coloring Layer Forming Coating Liquid D having the following composition was applied to one surface of the first substrate sequentially in plane with the sublimation transfer coloring layers formed as described above and was dried to form Thermofusible Transfer Coloring Layer D having a thickness of 0.7 μm.

| <Coloring Layer Forming Coating Liquid D> | |
|---|---|
| Carbon black | 50 parts by mass |
| Vinyl chloride-vinyl acetate copolymer (SOLBIN (registered trademark) CNL manufactured by Nissin Chemical Co., Ltd.) | 50 parts by mass |
| MEK | 200 parts by mass |
| Toluene | 200 parts by mass |

Primer Layer Forming Coating Liquid B having the following composition was applied to one surface of the first substrate sequentially in plane with the coloring layers formed as described above and was dried to form a primer layer having a thickness of 0.1 μm. A peel-off layer forming coating liquid having the following composition was then applied to the primer layer and was dried to form a peel-off layer having a thickness of 0.5 μm.

| <Primer Layer Forming Coating Liquid B> | |
|---|---|
| Polyester (Mor-Ester 49000 manufactured by Morton Chemical Company) | 10 parts by mass |
| Dimethyl carbonate | 45 parts by mass |
| Methyl ethyl ketone | 45 parts by mass |

| <Peel-Off Layer Forming Coating Liquid> | |
|---|---|
| Vinyl chloride-vinyl acetate copolymer (SOLBIN (registered trademark) A manufactured by Nissin Chemical Co., Ltd.) | 5 parts by mass |
| MEK | 47.5 parts by mass |
| Toluene | 47.5 parts by mass |

A heat seal layer forming coating liquid having the following composition was applied to one surface of the first substrate sequentially in plane with the peel-off layer formed as described above and was dried to form a heat seal layer having a thickness of 1 μm.

| <Heat Seal Layer Forming Coating Liquid> | |
|---|---|
| Vinyl chloride-vinyl acetate copolymer (SOLBIN (registered trademark) CNL manufactured by Nissin Chemical Co., Ltd.) | 20 parts by mass |
| MEK | 40 parts by mass |
| Toluene | 40 parts by mass |

A back layer forming coating liquid having the following composition was applied to the other surface of the first substrate and was dried to form a back layer having a thickness of 1 μm. Thus, a thermal transfer sheet was obtained.

| <Back Layer Forming Coating Liquid> | |
|---|---|
| Polyvinyl butyral (S-LEC (registered trademark) BX-1 manufactured by Sekisui Chemical Co., Ltd.) | 2 parts by mass |
| Polyisocyanate (BURNOCK (registered trademark) D750 manufactured by DIC Corporation) | 9.2 parts by mass |
| Phosphate surfactant (PLYSURF (registered trademark) A208N manufactured by DKS Co. Ltd.) | 1.3 parts by mass |
| Talc (MICRO ACE (registered trademark) P-3 manufactured by Nippon Talc Co., Ltd.) | 0.3 parts by mass |
| MEK | 43.6 parts by mass |
| Toluene | 43.6 parts by mass |

[Fabrication of Intermediate Transfer Medium]

A PET having a thickness of 12 μm was provided as a second substrate. A peeling layer forming coating liquid having the following composition was applied to one surface of the second substrate and was dried to form a peeling layer having a thickness of 1.6 μm.

The resin material and particles forming the peeling layer had refractive indices of 1.49 and 1.66, respectively.

| <Peeling Layer Forming Coating Liquid> | |
|---|---|
| (Meth)acrylic resin (DIANAL (registered trademark) BR-87 manufactured by Mitsubishi Chemical Corporation) | 95 parts by mass |
| Polyester (VYLON (registered trademark) 200 manufactured by Toyobo Co., Ltd.) | 5 parts by mass |
| Melamine resin particles (EPOSTAR (registered trademark) M30 manufactured by Nippon Shokubai Co., Ltd.) | 50 parts by mass |
| MEK | 300 parts by mass |
| Toluene | 300 parts by mass |

A protective layer forming coating liquid having the following composition was applied to the peeling layer formed as described above and was dried to form a protective layer having a thickness of 4 μm.

| <Protective Layer Forming Coating Liquid> | |
|---|---|
| Polyester (elitel (registered trademark) UE-9885 manufactured by Unitika Ltd.) | 20 parts by mass |
| MEK | 40 parts by mass |
| Toluene | 40 parts by mass |

A receiving layer forming coating liquid having the following composition was applied to the protective layer formed as described above and was dried to form a receiving layer having a thickness of 2 μm. Thus, an intermediate transfer medium was obtained.

| <Receiving Layer Forming Coating Liquid> | |
|---|---|
| Vinyl chloride-vinyl acetate copolymer (SOLBIN (registered trademark) CNL manufactured by Nissin Chemical Co., Ltd.) | 95 parts by mass |
| Epoxy-modified silicone oil (KP-1800U manufactured by Shin-Etsu Chemical Co., Ltd.) | 5 parts by mass |
| MEK | 200 parts by mass |
| Toluene | 200 parts by mass |

[Manufacture of Printed Material]

The above thermal transfer sheet and intermediate transfer medium and a thermal transfer printer were provided.

The receiving layer of the intermediate transfer medium and the coloring layers of the thermal transfer sheet were stacked together, and the thermal transfer sheet was heated from the back layer side using a thermal head included in the following thermal transfer printer to form an image on the receiving layer included in the intermediate transfer medium.

(Thermal Transfer Printer)

Thermal head: KEE-57-12GAN2-STA manufactured by Kyocera Corporation

Average resistance value of heating element: 3303 Ω

Print density in main scanning direction: 300 dpi

Print density in sub-scanning direction: 300 dpi

Print voltage: 18.5 V

One-line period: 3 msec.

Print start temperature: 35° C.

Pulse duty ratio: 85%

The receiving layer of the intermediate transfer medium and the peel-off layer of the thermal transfer sheet were then stacked together, and the receiving layer and the peel-off layer were pressure-bonded by applying a pressure of 0.078 MPa while heating the thermal transfer sheet using the thermal head from the back layer side at a position corresponding to a region to be removed with a size of 1 cm×5 cm. Thereafter, the thermal transfer sheet was peeled to peel off the transfer layer composed of the receiving layer, the protective layer, and the peeling layer from the region to be removed of the intermediate transfer medium.

The above thermal transfer printer was then used to transfer the heat seal layer from the thermal transfer sheet to the entire surface of the intermediate transfer medium after peel-off.

A vinyl chloride card (manufactured by Dai Nippon Printing Co., Ltd.) was provided as a transfer-receiving article, and the heat seal layer and the partially peeled-off transfer layer were transferred from the intermediate transfer medium to one surface of the vinyl chloride card to obtain a printed material. In the region of the intermediate transfer medium where the transfer layer was not peeled off, the laminate of the transfer layer and the heat seal layer was transferred to the transfer-receiving article. In the region of the intermediate transfer medium where the transfer layer was peeled off, only the heat seal layer was transferred to the transfer-receiving article.

The thus-obtained printed material had a raised portion in the region where the transfer layer was transferred and had a matt image formed in that region, demonstrating that the printed material had high design quality.

The transfer layer and heat seal layer of the resulting printed material had 45-degree specular glosses of 20.0% and 85.0%, respectively.

Example 2

A printed material was fabricated as in Example 1 except that the composition of the peeling layer forming coating liquid was changed as follows. The thus-obtained printed material had a raised portion in the region where the transfer layer was transferred and had a matt image formed in that region, demonstrating that the printed material had high design quality.

The resin material and particles forming the peeling layer had refractive indices of 1.49 and 1.66, respectively.

The transfer layer and heat seal layer of the resulting printed material had 45-degree specular glosses of 43.1% and 85.0%, respectively.

| <Peeling Layer Forming Coating Liquid> | |
|---|---|
| (Meth)acrylic resin (DIANAL (registered trademark) BR-113 manufactured by Mitsubishi Chemical Corporation) | 67 parts by mass |
| (Meth)acrylic resin (DIANAL (registered trademark) BR-52 manufactured by Mitsubishi Chemical Corporation) | 28 parts by mass |
| Polyester (VYLON (registered trademark) 200 manufactured by Toyobo Co., Ltd.) | 5 parts by mass |
| Melamine resin particles (EPOSTAR (registered trademark) M30 manufactured by Nippon Shokubai Co., Ltd.) | 50 parts by mass |
| MEK | 300 parts by mass |
| Toluene | 300 parts by mass |

Example 3

A printed material was fabricated as in Example 1 except that the melamine resin particles in the peeling layer forming coating liquid were replaced with (meth)acrylic resin particles (EPOSTAR (registered trademark) MA1002 manufactured by Nippon Shokubai Co., Ltd.). The thus-obtained printed material had a raised portion in the region where the transfer layer was transferred and had a matt image formed in that region, demonstrating that the printed material had high design quality.

The resin material and particles forming the peeling layer had refractive indices of 1.49 and 1.51, respectively.

The transfer layer and heat seal layer of the resulting printed material had 45-degree specular glosses of 50.3% and 85.0%, respectively.

Example 4

A printed material was fabricated as in Example 1 except that the melamine resin particles in the peeling layer forming coating liquid were replaced with silica particles (SEAHOSTAR (registered trademark) KE-P250 manufactured by Nippon Shokubai Co., Ltd.). The thus-obtained printed material had a raised portion in the region where the transfer layer was transferred and had a matt image formed in that region, demonstrating that the printed material had high design quality.

The resin material and particles forming the peeling layer had refractive indices of 1.49 and 1.43, respectively.

The transfer layer and heat seal layer of the resulting printed material had 45-degree specular glosses of 58.9% and 85.0%, respectively.

Example 5

A printed material was fabricated as in Example 1 except that the melamine resin particles in the peeling layer forming coating liquid were replaced with a pearl pigment (Iriodin (registered trademark) 111 WNT manufactured by Merck). The transfer layer had a $\Delta L^*_T$ of 37, and the heat seal layer had a $\Delta L^*_{HS}$ of 23. The thus-obtained printed material had a raised portion in the region where the transfer layer was transferred and had a pearly image formed in that region, demonstrating that the printed material had high design quality.

Example 6

A printed material was fabricated as in Example 1 except that the melamine resin particles in the peeling layer forming coating liquid were replaced with foaming particles (Matsumoto Microsphere (registered trademark) FN-100M manufactured by Matsumoto Yushi-Seiyaku Co., Ltd.), and the transfer-receiving article was heated to 170° C. after the transfer of the transfer layer. The transfer layer had a surface roughness ($Ra_T$) of 2.4 μm, and the heat seal layer had a surface roughness ($Ra_{HS}$) of 1.1 μm. The thus-obtained printed material had a raised portion in the region where the transfer layer was transferred and had an image formed in that region, demonstrating that the printed material had a very high level of stereoscopic effect.

Example 7

A printed material was fabricated as in Example 1 except that the heat seal layer forming coating liquid used in the fabrication of the thermal transfer sheet was replaced with one having the following composition, and the peeling layer forming coating liquid used in the fabrication of the intermediate transfer medium was replaced with one having the following composition. The transfer layer had an average specular reflectance ($R_T$) of 25%, and the heat seal layer had an average specular reflectance ($R_{HS}$) of 54%.

The thus-obtained printed material had a raised portion in the region where the transfer layer was transferred and had a metallic image formed in that region, demonstrating that the printed material had high design quality.

| (Heat Seal Layer Forming Coating Liquid) | |
|---|---|
| Vinyl chloride-vinyl acetate copolymer (SOLBIN (registered trademark) CNL manufactured by Nissin Chemical Co., Ltd.) | 20 parts by mass |
| Aluminum pigment | 20 parts by mass |
| MEK | 40 parts by mass |
| Toluene | 40 parts by mass |

| (Peeling Layer Forming Coating Liquid) | |
|---|---|
| (Meth)acrylic resin (DIANAL (registered trademark) BR-87 manufactured by Mitsubishi Chemical Corporation) | 95 parts by mass |
| Polyester (VYLON (registered trademark) 200 manufactured by Toyobo Co., Ltd.) | 5 parts by mass |
| MEK | 300 parts by mass |
| Toluene | 300 parts by mass |

Example 8

A printed material was fabricated as in Example 1 except that no melamine resin particles were contained in the peeling layer forming coating liquid. The thus-obtained printed material had a raised portion in the region where the transfer layer was transferred and had an image formed in that region, although there was low contrast between the raised portion and the other portion.

The transfer layer and heat seal layer of the resulting printed material had 45-degree specular glosses of 80.7% and 85.0%, respectively. The transfer layer had a $\Delta L^*_T$ of 25, and the heat seal layer had a $\Delta L^*_{HS}$ of 23. The transfer layer had a surface roughness ($Ra_T$) of 1.4 μm, and the heat seal layer had a surface roughness ($Ra_{HS}$) of 1.1 μm. The transfer layer had an average specular reflectance ($R_T$) of 25%, and the heat seal layer had an average specular reflectance ($R_{HS}$) of 18%.

Example 9

A printed material was fabricated as in Example 1 except that the melamine resin particles in the peeling layer forming coating liquid were replaced with fluororesin particles (Fluon PFA manufactured by AGC Chemicals Company). The thus-obtained printed material had a raised portion in the region where the transfer layer was transferred and had an image formed in that region, although there was low contrast between the raised portion and the other portion.

The resin material and particles forming the peeling layer had refractive indices of 1.49 and 1.34, respectively.

The transfer layer and heat seal layer of the resulting printed material had 45-degree specular glosses of 68.2% and 85.0%, respectively. The transfer layer had a $\Delta L^*_T$ of 24, and the heat seal layer had a $\Delta L^*_{HS}$ of 23. The transfer layer had a surface roughness ($Ra_T$) of 1.3 μm, and the heat seal layer had a surface roughness ($Ra_{HS}$) of 1.1 μm. The transfer layer had an average specular reflectance ($R_T$) of 21%, and the heat seal layer had an average specular reflectance ($R_{HS}$) of 18%.

Comparative Example 1

A printed material was fabricated as in Example 8 except that the transfer of the heat seal layer from the thermal transfer sheet was not performed in the manufacture of the printed material. However, the transfer of the transfer layer to the transfer-receiving article became unstable near the peeled-off region, and a transfer defect occurred. In contrast, no transfer defect occurred in Examples 1 to 9.

As will be understood by those skilled in the art, the combination and the like of the present disclosure are not limited by the description of the above examples, and the above examples and specification are intended merely to explain the principles of the present disclosure. Various modifications or improvements can be made without departing from the spirit and scope of the present disclosure, and all such modifications or improvements are included within the scope of the present disclosure claimed for protection. Furthermore, the scope of the present disclosure claimed for protection includes the description of the claims and equivalents thereof.

REFERENCE SIGNS LIST

10: thermal transfer sheet
11: first substrate
12: coloring layer
13: peel-off layer
14: heat seal layer
15: back layer
20: intermediate transfer medium
21: second substrate
22: transfer layer
23: peeling layer
24: receiving layer
25: protective layer
30: printed material

The invention claimed is:

1. A combination of a thermal transfer sheet and an intermediate transfer medium, wherein the thermal transfer sheet comprises a first substrate and a coloring layer, a peel-off layer, and a heat seal layer sequentially provided in this order on the first substrate, wherein the intermediate transfer medium comprises a second substrate and a transfer layer, wherein the peel-off layer is a layer for removing a portion of the transfer layer from the intermediate transfer medium, wherein the heat seal layer is a layer that is transferred to areas of the intermediate transfer medium from which the transfer layer has not been removed and to areas of the intermediate transfer medium from which the transfer layer has been removed, and wherein an absolute value of a difference in 45-degree specular gloss between the heat seal layer and the transfer layer is 20% or more, wherein the heat seal layer includes a layer containing a resin material and particles, and the content of the particles in the layer is 30 parts by mass or more and 120 parts by mass or less based on 100 parts by mass of the resin material, wherein the value obtained by subtracting the refractive index of the resin material from the refractive index of the particles is 0.01 or more and 0.4 or less, and wherein the transfer layer includes a layer containing a resin material and no particles.

* * * * *